United States Patent
Akutsu et al.

(10) Patent No.: US 6,476,533 B2
(45) Date of Patent: Nov. 5, 2002

(54) STATOR FOR STARTER MOTOR

(75) Inventors: Satoru Akutsu; Yuji Nakahara, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/768,244

(22) Filed: Jan. 25, 2001

(65) Prior Publication Data

US 2002/0008434 A1 Jan. 24, 2002

(30) Foreign Application Priority Data

Jul. 24, 2000 (JP) ........................................ 2000-221853

(51) Int. Cl.$^7$ ................................................. H02K 1/12
(52) U.S. Cl. ........................ 310/259; 310/216; 310/217
(58) Field of Search ................................. 310/216, 254, 310/217, 218, 258, 259, 42; 29/596–598

(56) References Cited

U.S. PATENT DOCUMENTS

| | | | | |
|---|---|---|---|---|
| 1,756,672 A | * | 4/1930 | Barr ............................ | 310/216 |
| 1,808,572 A | * | 6/1931 | Reist ........................... | 310/216 |
| 2,795,713 A | * | 6/1957 | Woll ........................... | 310/258 |
| 5,729,072 A | * | 3/1998 | Hirano et al. ................ | 310/258 |
| 5,786,651 A | * | 7/1998 | Suzuki ........................ | 310/259 |
| 6,127,753 A | * | 10/2000 | Yamazaki et al. ............ | 310/71 |
| 6,300,700 B1 | * | 10/2001 | Nishiyama et al. ..... | 310/156.45 |

FOREIGN PATENT DOCUMENTS

| | | |
|---|---|---|
| JP | 2000-116075 | 4/2000 |
| JP | 2000-116974 | 4/2000 |

\* cited by examiner

*Primary Examiner*—Tran Nguyen
(74) *Attorney, Agent, or Firm*—Sughrue Mion, PLLC

(57) ABSTRACT

In a stator, which is composed of a stacked core, for a starter motor according to the present invention, the stacked core being arranged such that a plurality of sheet members each having a yoke portion and a pole portion are disposed like a band, adjacent sheet members are stacked and coupled with each other so that the ends of the yoke portions thereof are overlapped, the plurality of sheet members are made to an annular shape by being bent at the coupled portions thereof to cause the pole portions to face the center of the annular shape, and the plurality of sheet members are formed in at least an approximately linear shape when developed, resin winding cores are interposed between the pole potions and wires wound around the pole portions. With this arrangement, there can be obtained a stator for a starter motor the cost of which can be reduced.

11 Claims, 10 Drawing Sheets

STATOR FOR STARTER MOTOR

BACKGROUND OF THE INVENTION

1. Field of the Invention

The present invention relates to a stator for a starter motor used in vehicles and the like, and more particularly, to a stator for a starter motor having a bendable stacked core.

2. Description of the Related Art

FIG. 14 is a perspective view showing the structure of a stator for a conventional starter motor; FIG. 15 is a plan view of the stator; and FIG. 16 is a perspective view showing an assembly process of the stator.

In the figures, four poles 104 are disposed in a cylindrical yoke 103. Field coils 107 are mounted on the four poles 104.

In the conventional stator arranged as described above, the yoke 103 is arranged as the cylindrical yoke ("bent yoke portion") by rounding a sheet member and welding the joints thereof. Spigot portions 106, which are formed at the ends of the yoke 103 in the axial direction thereof, are processed by machining, and fitted to not shown brackets.

Further, the poles 104 are made in a different process by, for example, forging or the like and mounted on the yoke 103 later. Furthermore, the field coils 107 are previously wounded in a different process and the spaces between wires are previously subjected to insulation processing by powder coating or the like.

The conventional stator arranged as described above is assembled in such a manner that, first, the electric field coils 107, which have been wounded and subjected to the insulation processing, are mounted on the poles 104. Then, the poles 104 are mounted on the yoke 103 through the mounting holes 103a thereof by caulking, screws or the like.

In the stator for the starter motor arranged as described above, the yoke 103 must have a predetermined thickness because a yoke made of a thin sheet member cannot achieve its function. Thus, the yoke 103 is made in such a manner that a thick sheet member is cut off by a large press and gradually rounded so as to be formed in a cylindrical shape, then the cylindrical thick sheet member is subjected to a drawing process to provide it with accuracy by making the deformed portions of the cylindrical member to a perfect cylindrical shape. Thereafter, the spigot portions 106 are machined at the ends of the cylindrical member in the axial direction thereof and the mounting holes 103a are drilled to the cylindrical member.

The conventional so-called "bent yoke portion" made by the above method requires many dedicated apparatuses such as a large press, welder, outside diameter drawing machine, lathe, drilling machine, coating machine, and the like. Further, many processes are necessary to manufacture the "bent yoke" and the respective processing apparatuses are large in size, from which a problem arises in the manufacture of the "bent yoke".

SUMMARY OF THE INVENTION

An object of the present invention, which was made to solve the above problems, is to provide a stator for a starter motor whose manufacturing cost can be reduced.

In the stator, which is composed of a stacked core, for the starter motor according to the present invention, the stacked core being arranged such that a plurality of sheet members each having a yoke portion and a pole portion are disposed like a band, adjacent sheet members are stacked and coupled with each other so that the ends of the yoke portions thereof are overlapped, the plurality of sheet members are made to an annular shape by being bent at the coupled portions thereof to cause the pole portions to face the center of the annular shape, and the plurality of sheet members are formed in at least an approximately linear shape when developed, resin winding cores are interposed between the pole potions and wires wound around the pole portions.

DESCRIPTION OF THE PREFERRED EMBODIMENTS

First Embodiment

Figure 1:
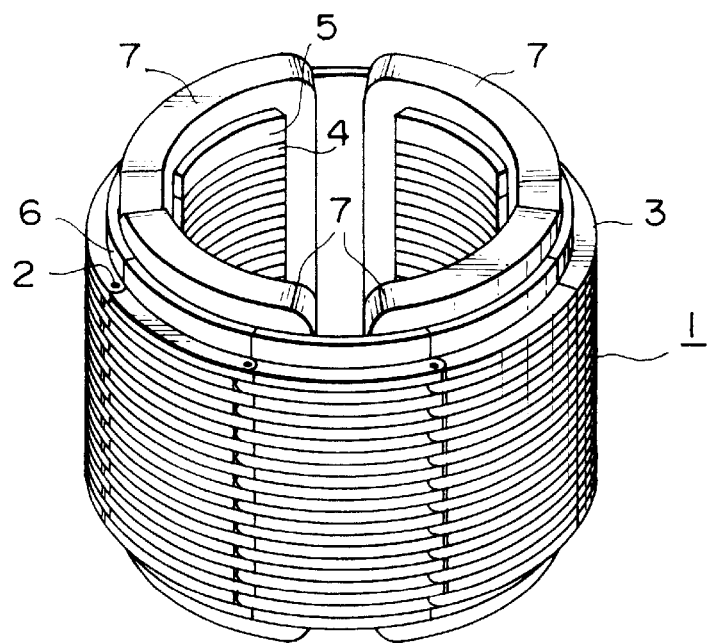
FIG. 1 is an overall perspective view showing a stator for a starter motor of an embodiment 1 of the invention.
Figure 2:
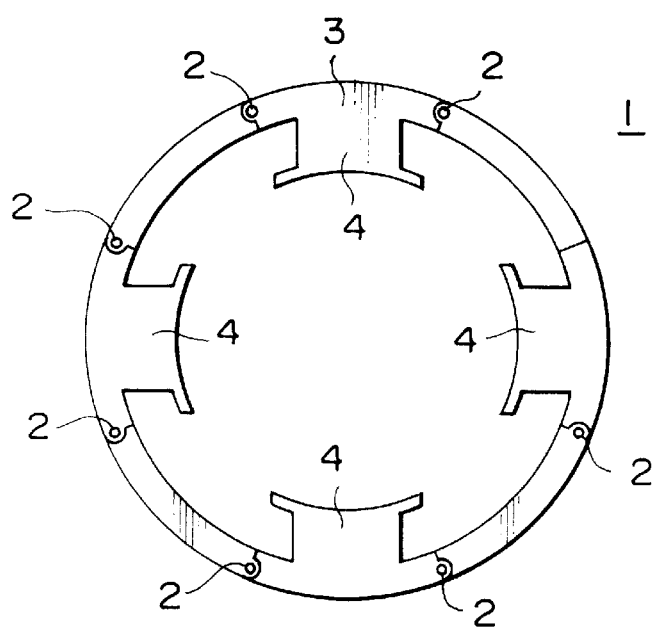
FIG. 2 is a plan view showing how a stator core is made by stacking thin sheets circularly.
Figure 3:
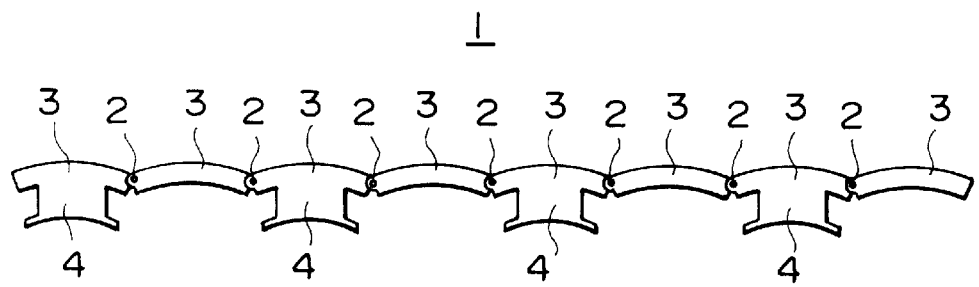
FIG. 3 is a plan view showing how a stator core is made by stacking thin sheets linearly.
Figure 4:
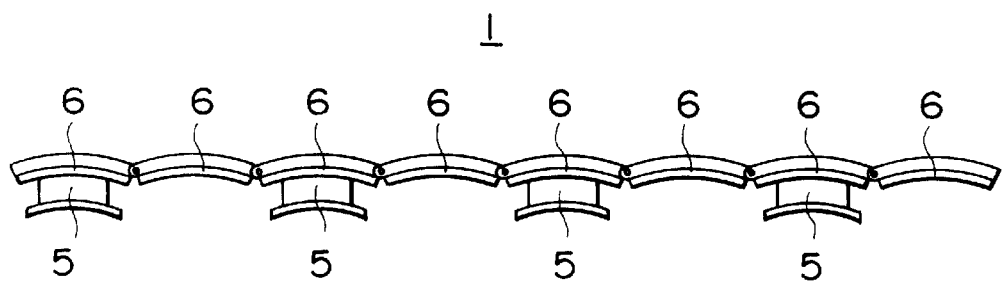
FIG. 4 is a plan view showing how a resin winding frame is formed around pole portions.
Figure 5:
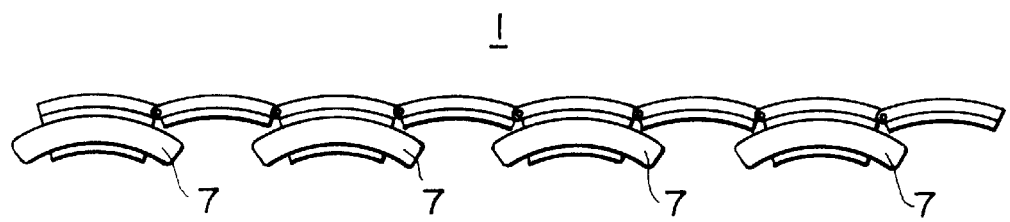
FIG. 5 is a plan view showing how a magnetic field wire is wound around the winding frame.
Figure 6:
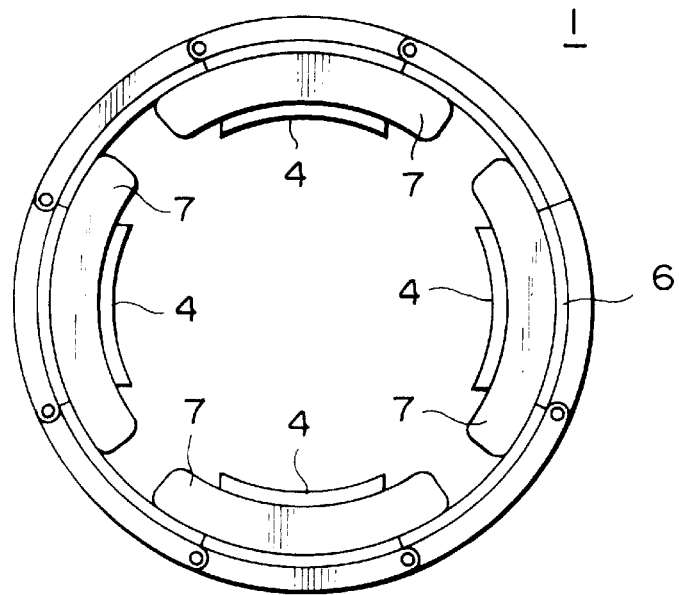
FIGS. 6 is a plan view showing how a stator core is rounded in a cylindrical shape and the joint portions thereof are welded.

FIG. 1 is an overall perspective view showing a stator for a starter motor of a first embodiment of the invention. FIGS. 2 to 6 are plan views showing manufacturing processes of the stator, respectively, wherein FIG. 2 is a plan view showing how a stator core is made by stacking thin sheet members circularly; FIG. 3 is a plan view showing how the stator core is made by stacking the thin sheet members linearly; FIG. 4 is a plan view showing how winding frames of resin are formed around pole portions; FIG. 5 is a plan view showing how a field windings are wound around the winding frames; and FIG. 6 is a plan view showing how a stator core is rounded in a cylindrical shape and the joints thereof are welded.

A stator core 1 of the first embodiment is generally called a "bent core" which is made by stacking thin sheet members such as silicon steel sheets or the like which have been stamped and caulked by a press, as shown in, for example, Japanese Unexamined Patent Application Publication No.

2000-116075. In the stator core 1, yoke portions 3 are arranged integrally with pole portions 4.

That is, a plurality of sheet members each having a yoke portion 3 and a pole portion 4 are disposed like a band and stacked and coupled with each other so that the ends of the yoke portions 3 of adjacent sheet members are overlapped. The sheet members each having a convex portion on one surface and a concave portion on the other surface are sequentially overlapped with each other at coupling portions 2 and stacked. As a result, the sheet members can be bent at the coupling portions 2, which permits the sheet members to be formed in an annular shape by being bent at the coupling portions 2 with the pole portions 4 facing the center of the annular shape. In contrast, when the annular sheet members are developed, they can be bent to cause the pole portions 4 to be disposed externally radially so that a wire can be easily wound around the pole portions 4.

A manufacturing method of the stator core will be described with reference to FIGS. 2 to 6.

In FIG. 2, the yoke portions 3 are formed integrally with the pole portions 4 and stacked by being stamped and caulked as described above. At the time, the respective yoke portions 3 are coupled with each other through the coupling portions 2 so that they can be developed at least linearly as shown in FIG. 3. The yoke portions 3 can be turned about the coupling portions 2, respectively. It should be noted that when the sheet members are stacked, they may be disposed circularly as shown in FIG. 2 or may be disposed linearly as shown in FIG. 3.

After the sheet members are stacked as described above, winding frames 5 made of resin are formed around the pole portions 4 by a resin molding method as shown in FIG. 4. At this time, spigot portions 6, which are fitted to not shown brackets, are formed at the ends of the winding frames 5 in the axial direction thereof together with winding frames 5. The spigot portions 6 are stepped portions formed around the entire circumference of the winding frames 5.

Thereafter, field windings 7 are wound round the winding frames 5 formed around the pole portions 4 in a process shown in FIG. 5. After the field windings 7 are wound, the stator core 1 is rounded in a cylindrical shape in a process shown in FIG. 6, and the abutting sections at both the ends thereof acting as joint portions are welded by laser welding or the like.

In the stator for the starter motor of the first embodiment arranged as described above, the stator core 1 can be formed in at least an approximately linear shape when it is developed, and the field windings 7 can be directly wound around the pole portions 4 because the winding frames 5 are formed around the pole portions 4. The insulating property of the wound wires can be improved without damaging the insulating films thereof because the winding frames 5 prevent the magnetic field wire 7 from being in direct contact with the pole portions 4. Further, it is also possible to wind wires having no insulating film while sandwiching interwire members (for example, insulating papers) or the like between the wound wires.

Further, the manufacture of the stator core 1 does not require large processing apparatuses because it is arranged as the stacked core and can be made by simple apparatuses such as a general-purpose press, molding machine, winder and the like, whereby the manufacturing cost of the stator core 1 can be reduced.

Further, in the first embodiment, the spigot portions 6, which are fitted to the not shown brackets, are formed at the ends of the winding frames 5 in the axial direction thereof. The formation of the spigot portions 6 simultaneously with the formation of the winding frames 5 by means of by the resin molding method eliminates the need of conventional machining, which can reduce the manufacturing cost of the stator core 1.

Note that, in the first embodiment, the field windings 7 are wound in the state in which the stator core 1 is developed approximately linearly. When the wires are thin, the stator core 1 may be developed linearly as described above. However, when the wires are thick, the stator core 1 may be developed more than a linear state so that the pole portions 4 are disposed externally radially.

Further, while the spigot portions 6 are formed around the entire circumference of the winding frames 5 in the first embodiment, they may be of course formed around only the portions where the winding frames 5 exist. When the spigot portions 6 are formed around the entire circumference of the winding frames 5, they can be reliably fitted to the not shown brackets, whereas when the spigot portions 6 are formed only around the portions where the winding frames 5 exist, the stator core 1 can be manufactured easily.

Second Embodiment

Figure 7:
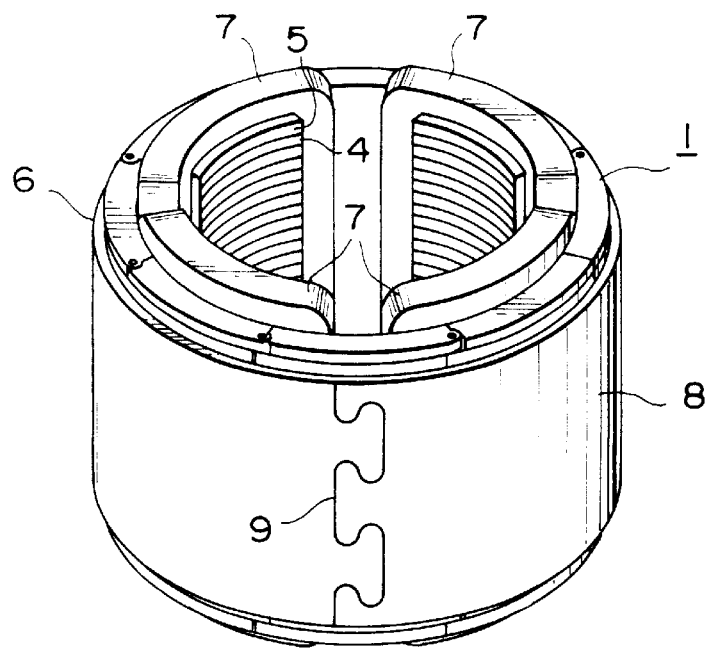
FIG. 7 is an overall perspective view showing the stator for the starter motor of an embodiment 2 of the invention.
Figure 8:
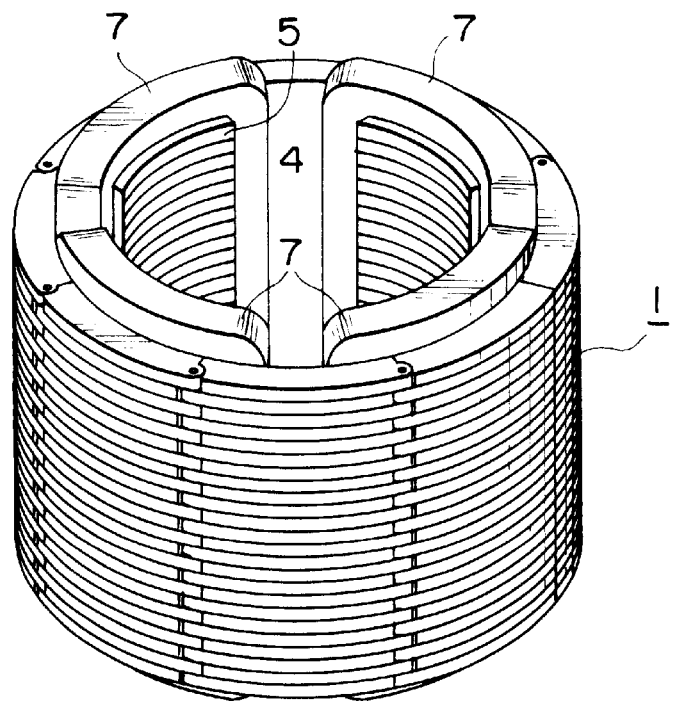
FIG. 8 is a perspective view showing a manufacturing process of the stator of the embodiment 2 of the invention.
Figure 8:
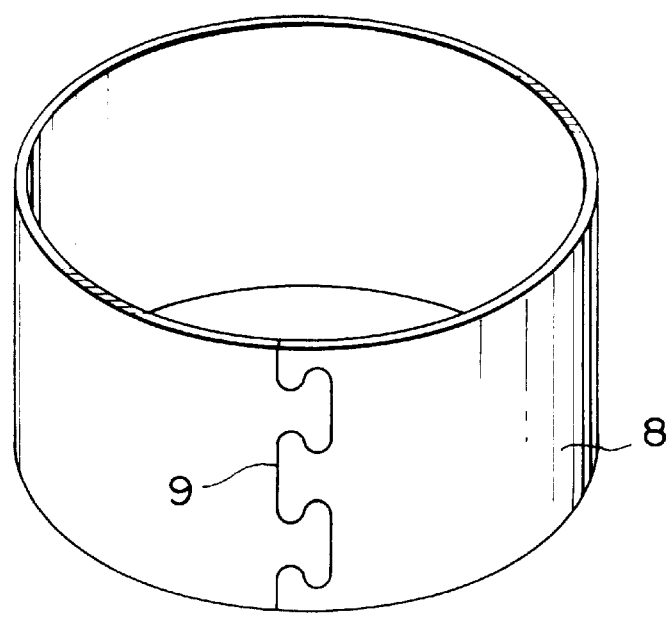

FIG. 7 is an overall perspective view showing the stator for the starter-motor of a second embodiment of the invention; and FIG. 8 is a perspective view showing a manufacturing process of the stator of the second embodiment. In the second embodiment, no spigot portion is formed on winding frames 5 which are formed around pole portions 4 by the resin molding method.

In the second embodiment, a second cylindrical yoke 8 whose axial length is shorter than that of a stacked core 1 is combined with the outer circumference of the stacked core 1 as shown well in FIG. 8. Then, the stepped portions formed by the stacked core 1 and the second cylindrical yoke 8 act as spigot portions 6 to be combined with not shown brackets.

In the stator for the starter motor of the second embodiment arranged as described above, the second cylindrical yoke 8 is disposed around the outer circumference of the stacked core 1. As a result, a change in the radial direction of the second cylindrical yoke 8 can change the thickness of the overall yoke without replacing a metal mold, which permits optimum thicknesses applicable to many types of stacked cores to be obtained.

Further, the axial length of the second cylindrical yoke 8 is shorter than that of the stacked core 1 so as to form the spigot portions 6 to be fitted to the brackets, which can reduce the manufacturing cost of the stacked core 1 because the machining necessary to form the conventional spigot portions 6 is not necessary.

Note that the second cylindrical yoke 8 is made by a clinch forming method so as to be provided with clinch portions 9. It may be possible to clinch the second cylindrical yoke 8 so that the inside diameter thereof is made smaller than the outside diameter of the stacked core 1 and to secure the second cylindrical yoke 8 to the stacked core 1 making use of spring back.

Third Embodiment

Figure 9:
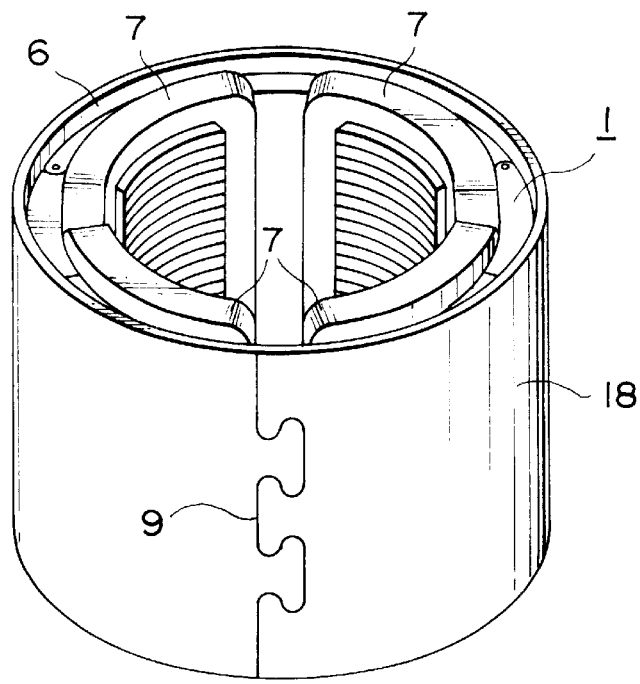
FIG. 9 is an overall perspective view showing the stator for the starter motor of an embodiment 3 of the invention.

FIG. 9 is an overall perspective view showing the stator for the starter motor of a third embodiment of the invention. In the third embodiment, no spigot portion is formed on winding frames 5 which are formed around pole portions 4 by means of the resin molding method similarly to the second embodiment.

Then, in the third embodiment, a second cylindrical yoke 18 whose axial length is longer than that of a stacked core 1 is combined with the outer circumference of the stacked core 1 as shown in FIG. 9. Then, the stepped portions formed by the stacked core 1 and the second yoke 18 act as spigot portions 6 to be combined with not shown blackets.

In the stator for the starter motor of the third embodiment arranged as described above, the axial length of the second yoke 18 is longer than that of the stacked core 1 to thereby form the spigot portions 6 to be fitted to the not shown brackets, which can reduce the manufacturing cost of the stacked core 1 because the machining necessary to form the conventional spigot portions 6 is not necessary.

Fourth Embodiment

Figure 10:
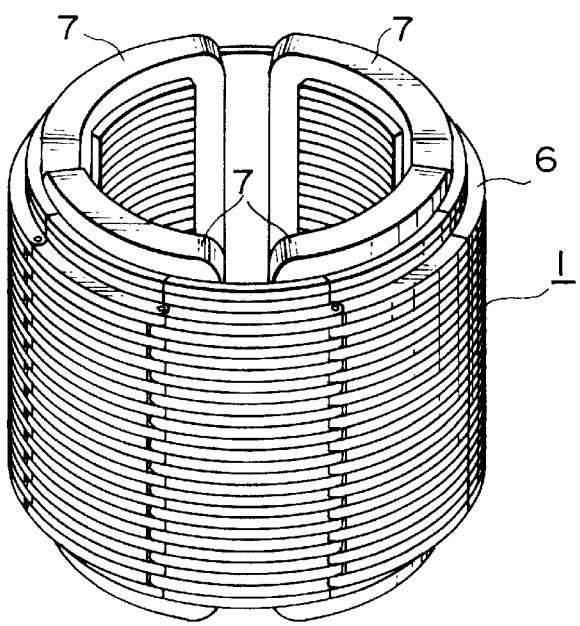
FIG. 10 is an overall perspective view showing the stator for the starter motor of an embodiment 4 of the invention.

FIG. 10 is an overall perspective view showing the stator for the starter motor of a forth embodiment of the invention. In the fourth embodiment, no spigot portion is formed on winding frames 5 which are formed around pole portions 4 by means of the resin molding method similarly to the embodiment 2.

Then, in the fourth embodiment, stepped portions are formed on the outer circumference of a stacked core 1 at the ends in the axial direction thereof as shown in FIG. 10 so as to form spigot portions 6 to be fitted to brackets. The height of the stepped portions can be adjusted by disposing a predetermined number of thin sheet members each having a smaller outside diameter as necessary. That is, the stepped portions are formed around the outer circumference using two types of the stacked cores having a different outside diameter.

Note that the stepped portions acting as the spigot portions 6 may be formed by machining a stacked core 1 which entirely has a given outside diameter up to the ends thereof by, for example, a lathe or the like.

Fifth Embodiment

Figure 11:
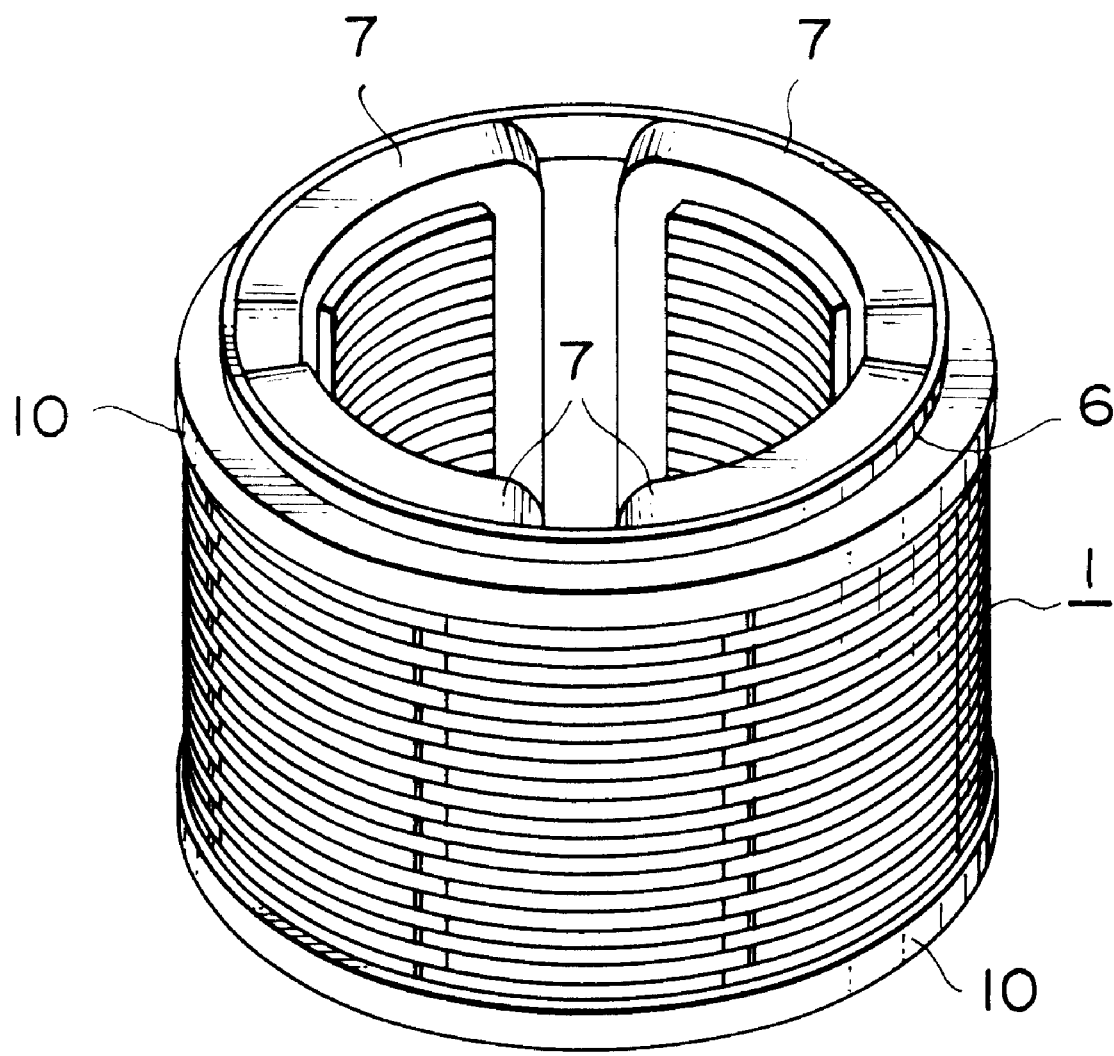
FIG. 11 is an overall perspective view showing the stator for the starter motor of an embodiment 5 of the invention.
Figure 12:
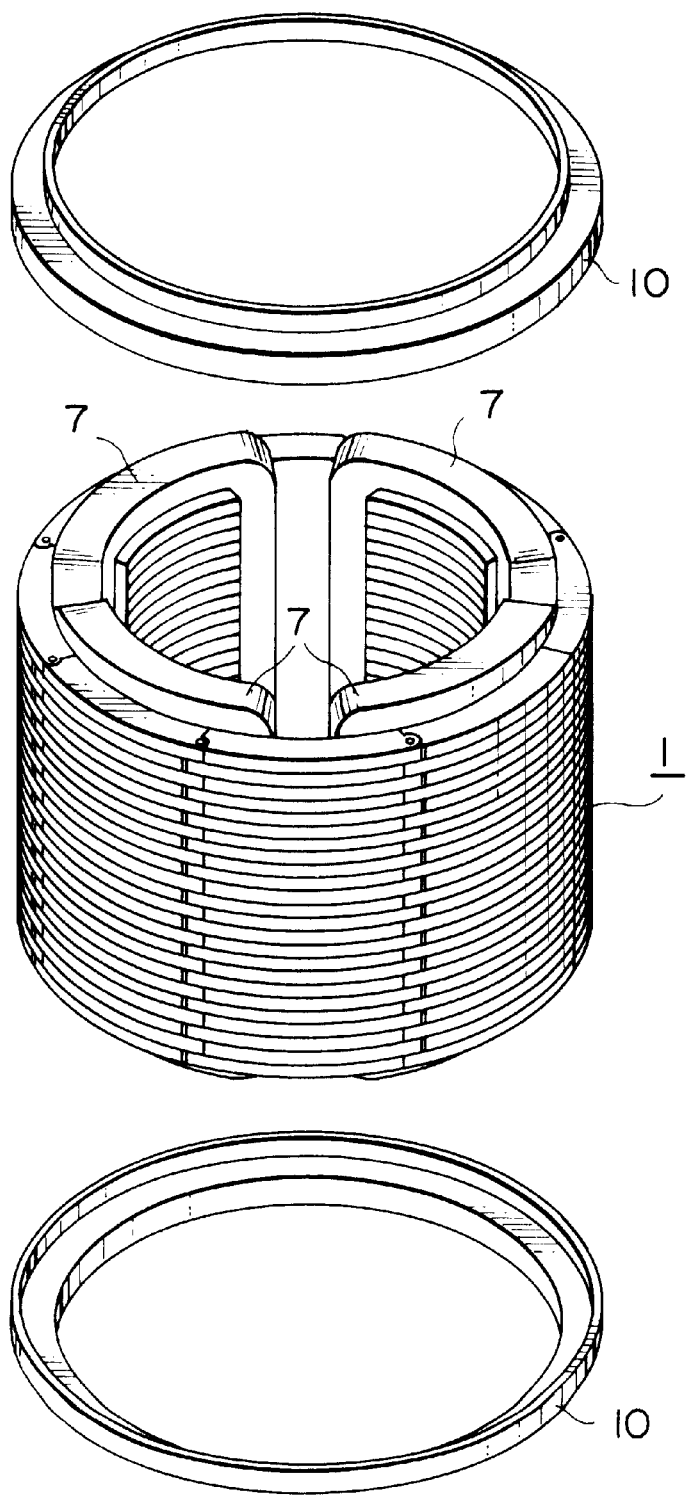
FIG. 12 is a perspective view showing a manufacturing process of the stator of the embodiment 5 of the invention.
Figure 13:
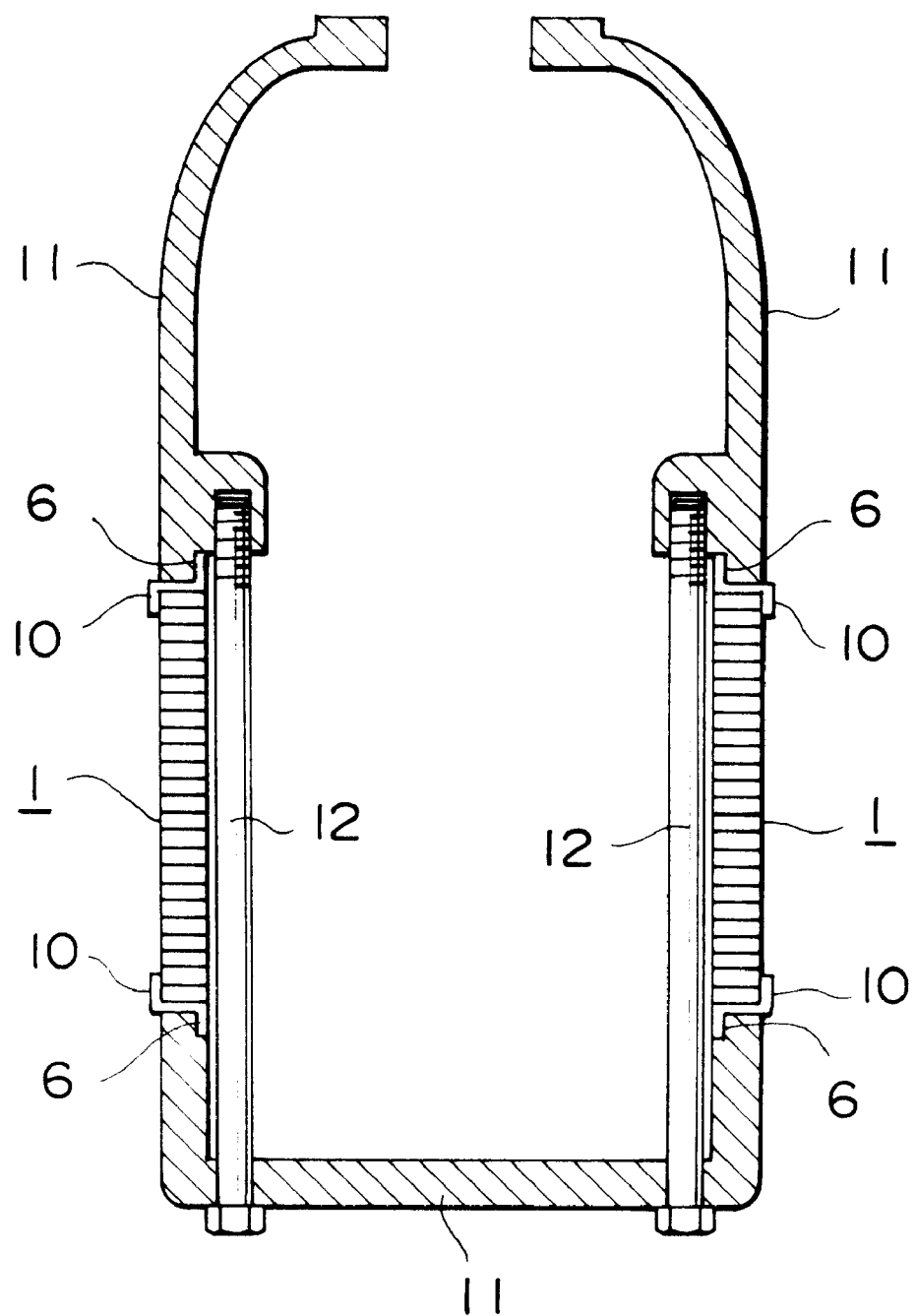
FIG. 13 is a sectional view of the starter motor of the embodiment 5 of the invention.
Figure 14:
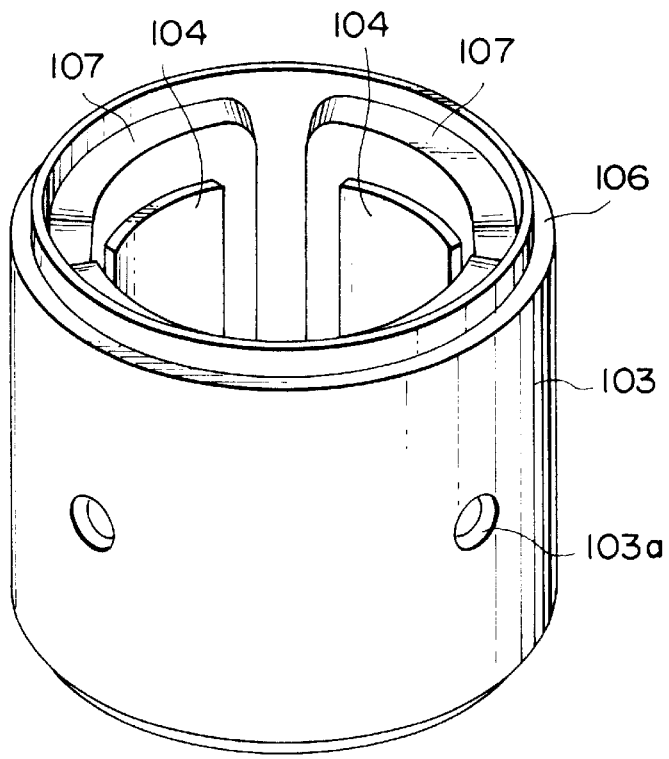
FIG. 14 is a perspective view showing the structure of a stator for a conventional starter motor.
Figure 15:
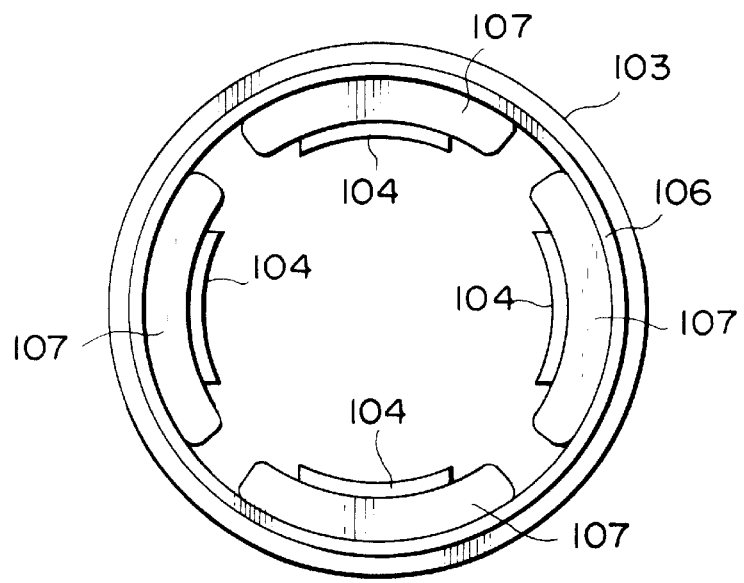
FIG. 15 is a plan view of the conventional stator.
Figure 16:
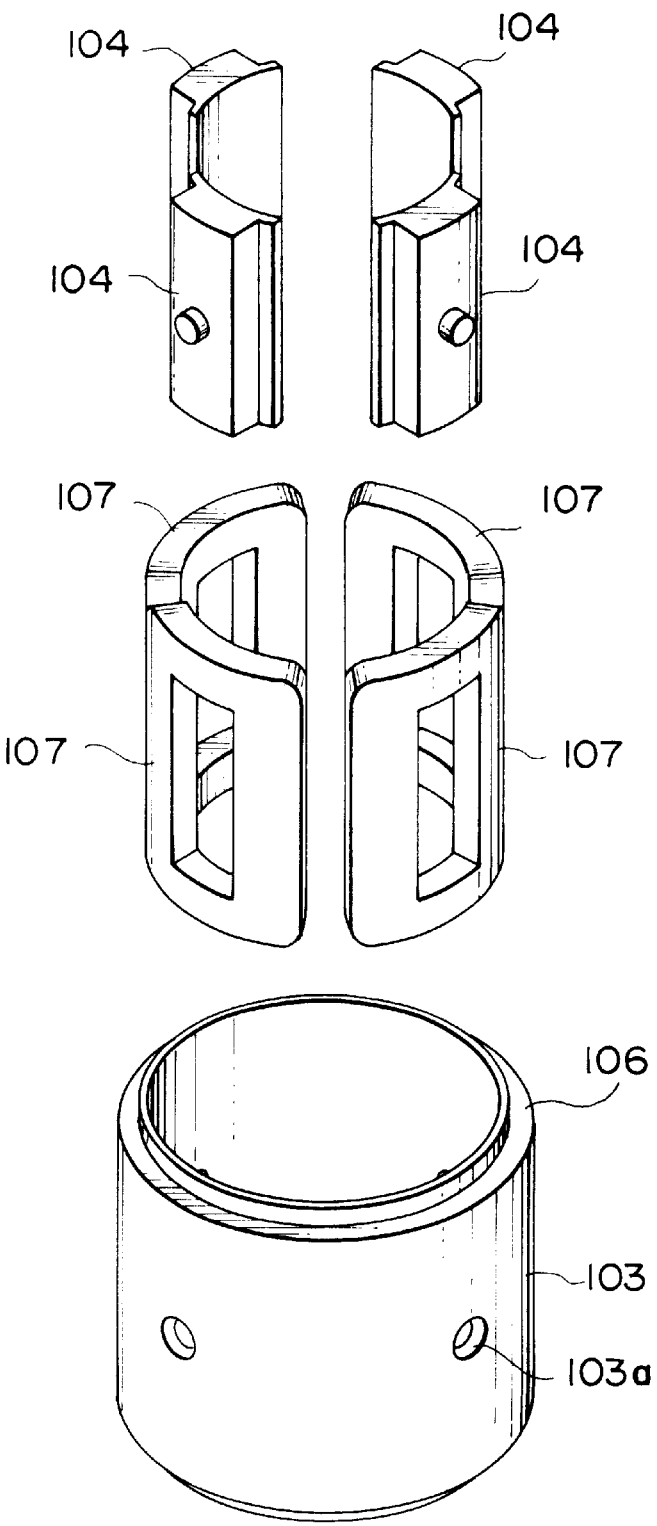
FIG. 16 is a perspective view showing an assembly process of the conventional stator.

FIG. 11 is an overall perspective view showing the stator for the starter motor of a fifth embodiment of the invention; FIG. 12 is a perspective view showing a manufacturing process of the stator of the fifth embodiment; and FIG. 13 is a sectional view of the starter motor of the fifth embodiment. In the fifth embodiment, no spigot portion is formed on winding frames 5 which are formed around pole portions 4 by a resin molding method similarly to the second embodiment.

Then, in the fifth embodiment, ring-shaped members 10 each having a stepped portion whose cross section is formed in a crank-shape, are fitted around the stacked core 1 at both the ends in the axial direction thereof, and the stepped portions of the ring-shaped members 10 are used as spigot portions 6 which are to be combined with two brackets 11 coupled with both the ends of the stacked core 1.

The ring-shaped members 10 are made of stamped steel sheets or the like. Each ring-shaped member 10 is fixed at a predetermined position by being held between each bracket 11 and the stacked core 1 by through bolts 12. As a result, it is not necessary to previously joint the ring-shaped members 10 to the stacked core 1.

In the stator, which is composed of the stacked core, for the starter motor, the stacked core being arranged such that a plurality of sheet members each having the yoke portion and the pole portion are disposed like a band, adjacent sheet members are stacked and coupled with each other so that the ends of the yoke portions thereof are overlapped, the plurality of sheet members are made to the annular shape by being bent at the coupled portions thereof to cause the pole portions to face the center of the annular shape, and the plurality of sheet members are formed in at least an approximately linear shape when developed, the resin winding cores are interposed between the pole potions and the wires wound around the pole portions. The provision of the resin winding frames permits the field windings to be directly wound around the pole portions. The direct contact of the field windings with the pole portions is prevented by the winding frames, which improves the insulating property of the wound wires without damaging the insulating films thereof. Further, the use of the stacked core eliminates the need of a large processing apparatuses, and the stator core can be made by simple apparatuses such as a multi-purpose press, molding machine, winder and the like, which reduces the manufacturing cost of the stator core.

Further, the spigot portion, which are fitted to the brackets, are formed at the ends of the winding frame in the axial direction thereof. The formation of the spigot portions on the winding frames permit the spigot portions to be formed easily, by which the manufacturing cost of the stator core can be reduced.

Further, the winding frames are made by the resin molding method, and the spigot portions are made simultaneously with the winding frames made by the resin molding method, which makes it unnecessary to perform conventional machining and can reduce the manufacturing cost of the stator core.

Further, the second cylindrical yoke is disposed around the outer circumference of the stacked core. As a result, a change of the radial thickness of the second yoke can change the overall thickness of the yoke without replacing the metal mold of the stacked core. Thus, optimum thicknesses applicable to many types of stacked cores can be obtained and the wasteful use of materials can be eliminated.

Further, the axial length of the second yoke is shorter than that of the stacked core so as to form the spigot portions to be fitted to the brackets. As a result, the machining necessary to make the conventional spigot portions is made unnecessary, whereby the manufacturing cost of the stator core can be reduced.

Further, the axial length of the second yoke is longer than that of the stator core so as to form the spigot portions which are fitted to the brackets. As a result, conventional machining necessary to make the spigot portions is made unnecessary, whereby the manufacturing cost of the stator core can be reduced.

Further, the second yoke is made by the clinch manufacturing method. As a result, the second cylindrical yoke can be easily secured to the stacked core by clinching the second yoke so that the inside diameter thereof is made smaller than the outside diameter of the stator core and securing it on the stacked core making use of the spring back.

Further, the stepped portions are formed around the outer circumference of stacked core at the ends in the axial direction thereof so as to form the spigot portions to be fitted to the brackets. As a result, the machining necessary to make the conventional spigot portions is made unnecessary, whereby the manufacturing cost of the stator core can be reduced.

Further, the stepped portions are formed by overlapping the two types of the stacked cores having a different outside diameter. As a result, the machining necessary to make the conventional spigot portions is made unnecessary, whereby the manufacturing cost of the stator core an be reduced. Further, the height of the stepped portions can be adjusted by appropriately changing the number of stacked core sheets.

In addition, the stepped portions are formed by machining the ends of the circumference of the stacked core. As a result, the machining of the spigot portions can be performed more easily than the machining carried out to make conventional spigot portions, whereby the manufacturing cost of the stator core can be reduced.

Further, the ring-shaped members each having the stepped portion are disposed at the ends of the stacked core in the axial direction thereof. The provision of the ringshaped member formed of the thin sheet member can make the outside diameter of the brackets smaller as compared with a case in which the spigot portions are made by machining.

What is claimed is:

1. A stator, which is comprised of a stacked core, for a starter motor, said stacked core comprising a plurality of sheet members comprising two groups of sheet members, wherein each of the sheet members of a first group comprise a yoke portion and a pole portions the pole portion extending from the yoke portion, and wherein each of the sheet members of a second group consists essentially of an arc-shaped yoke portion, and further wherein the first group and second group of sheet members are alternately arranged so as to be capable of being disposed as a band, adjacent sheet members are stacked and coupled with each other so that the ends of the yoke portions thereof are overlapped, said plurality of sheet members are made to an annular shape by being bent at the coupled portions thereof to cause said pole portions to face the center of said annular shape, and said plurality of sheet members are capable of being formed in at least an approximately linear shape thereby facilitating access to the pole pieces during attachment of wires.

2. A stator, which is comprised of a stacked core, for a starter motor said stacked core being arranged such-that a plurality of sheet members each having a yoke portion and a pole portion are capable of being disposed as a band, adjacent sheet members are stacked and coupled with each other so that the ends of the yoke portions thereof are overlapped, said plurality of sheet members are made to an annular shape by being bent at the coupled portions thereof to cause said pole portions to face the center of said annular shape, and said plurality of sheet members are capable of being formed in at least an approximately linear shape thereby facilitating access to the pole pieces during attachment of wires, wherein resin winding frames are interposed between said pole portions and wires wound around said pole portions, wherein spigot portions, which are capable of fitting to brackets, are formed at ends of said winding frames in the axial direction thereof.

3. A stator for a starter motor according to claim 1, further comprising resin winding frames interposed between said pole portions and wires wound around said pole portions, wherein said winding frames are molded resin.

4. A stator for a starter motor according to claim 1, wherein a second cylindrical yoke is disposed around the outer circumference of said stacked core.

5. A stator for a starter motor, which is comprised of a stacked core, said stacked core being arranged such that a plurality of sheet members each having a yoke portion and a pole portion are capable of being disposed as a band, adjacent sheet members are stacked and coupled with each other so that the ends of the yoke portions thereof are overlapped, said plurality of sheet members are made to an annular shape by being bent at the coupled portions thereof to cause said pole portions to face the center of said annular shape, and said plurality of sheet members are capable of being formed in at least an approximately linear shape thereby facilitating access to the pole pieces during attachment of wires, wherein resin winding frames are interposed between said pole portions and wires wound around said pole portions, wherein a second cylindrical yoke is disposed around the outer circumference of said stacked core, and further wherein the axial length of said second yoke is shorter than that of said stacked core so as to form spigot portions capable of fitting to brackets.

6. A stator for a starter motor, which is comprised of a stacked core, said stacked core being arranged such that a plurality of sheet members each having a yoke portion and a pole portion are capable of being disposed as a band, adjacent sheet members are stacked and coupled with each other so that the ends of the yoke portions thereof are overlapped, said plurality of sheet members are made to an annular shape by being bent at the coupled portions thereof to cause said pole portions to face the center of said annular shape, and said plurality of sheet members are capable of being formed in at least an approximately linear shape thereby facilitating access to the pole pieces during attachment of wires, wherein resin winding frames are interposed between said pole portions and wires wound around said pole portions, wherein a second cylindrical yoke is disposed around the outer circumference of said stacked core, and further wherein the axial length of said second yoke is longer than that of said stacked core so as to form spigot portions capable of fitting to brackets.

7. A stator for a starter motor, which is comprised of a stacked core, said stacked core being arranged such that a plurality of sheet members each having a yoke portion and a pole portion are capable of being disposed as a band, adjacent sheet members are stacked and coupled with each other so that the ends of the yoke portions thereof are overlapped, said plurality of sheet members are made to an annular shape by being bent at the coupled portions thereof to cause said pole portions to face the center of said annular shape, and said plurality of sheet members are capable of being formed in at least an approximately linear shape thereby facilitating access to the pole pieces during attachment of wires, wherein resin winding frames are interposed between said pole portions and wires wound around said pole portions, wherein a second cylindrical yoke is disposed around the outer circumference of said stacked core, and further wherein said second yoke further comprises a clinch portion.

8. A stator for a starter motor, which is comprised of a stacked core, said stacked core being arranged such that a plurality of sheet members each having a yoke portion and a pole portion are capable of being disposed as a band, adjacent sheet members are stacked and coupled with each other so that the ends of the yoke portions thereof are overlapped, said plurality of sheet members are made to an annular shape by being bent at the coupled portions thereof to cause said pole portions to face the center of said annular shape, and said plurality of sheet members are capable of being formed in at least an approximately linear shape thereby facilitating access to the pole pieces during attachment of wires, wherein resin winding frames are interposed between said pole portions and wires wound around said pole portions, wherein stepped portions are formed around the outer circumference of said stacked core at the ends in the axial direction thereof so as to act as spigot portions capable of fitting to brackets.

9. A stator for a starter motor according to claim 8, wherein said stepped portions are formed by overlapping two types of said stacked cores having a different diameter.

10. A stator for a starter motor according to claim 8, wherein said stepped portions are formed by machining the outer circumference of said stacked core.

11. A stator for a starter motor, which is comprised of a stacked core, said stacked core being arranged such that a plurality of sheet members each having a yoke portion and a pole portion are capable of being disposed as a band, adjacent sheet members are stacked and coupled with each other so that the ends of the yoke portions thereof are overlapped, said plurality of sheet members are made to an annular shape by being bent at the coupled portions thereof to cause said pole portions to face the center of said annular shape, and said plurality of sheet members are capable of being formed in at least an approximately linear shape thereby facilitating access to the pole pieces during attachment of wires, wherein resin winding frames are interposed between said pole portions and wires wound around said pole portions, wherein ring-shaped members having stepped portions are disposed at the ends of said stacked core in the axial direction thereof.

* * * * *